United States Patent [19]
Baumgartner

[11] Patent Number: 5,749,633
[45] Date of Patent: May 12, 1998

[54] BRAKE BY WIRE SYSTEM

[75] Inventor: Ernst Severin Baumgartner, Dayton, Ohio

[73] Assignee: General Motors Corporation, Detroit, Mich.

[21] Appl. No.: 854,459

[22] Filed: May 12, 1997

[51] Int. Cl.⁶ ........................................... B60T 8/34
[52] U.S. Cl. ...................... 303/113.1; 303/115.2; 303/116.2; 188/72.5
[58] Field of Search .............. 303/113.1, 113.2, 303/115.2, 116.1, 116.2; 188/72.1, 72.4, 72.5

[56] References Cited

U.S. PATENT DOCUMENTS

| | | | |
|---|---|---|---|
| 3,277,982 | 10/1966 | Kimberlin | 188/152 |
| 3,730,306 | 5/1973 | Rath | 188/72.5 |
| 5,246,283 | 9/1993 | Shaw et al. | 303/115.2 |

*Primary Examiner*—Matthew C. Graham
*Attorney, Agent, or Firm*—Jeffrey A. Sedlar

[57] ABSTRACT

A braking system including a wheel brake with a dual piston caliper assembly provides a brake by wire add-on system with dual level manual override capabilities. A pressure control block associated with the wheel brake directs fluid pressure generated by the master cylinder to the first and the second pistons of the caliper assembly for operation of the braking system in a manual apply mode. An electro-hydraulic modulator generates operating pressure in the brake by wire mode. The electro-hydraulic modulator communicates with the pressure control block so that fluid pressure generated by the electro-hydraulic modulator is transmitted to a single piston of the caliper assembly and is prevented from being communicated to the first piston of the caliper assembly by a solenoid valve assembly positioned in the pressure control block.

6 Claims, 2 Drawing Sheets

BRAKE BY WIRE SYSTEM

This invention was made with government support under Contract No. DTFH61-94-X-00001 awarded by the U.S. Department of Transportation Federal Highway Administration. The government has certain rights in the invention.

TECHNICAL FIELD

The present invention relates to a brake by wire system and more particularly, to a vehicle braking system with a hydraulic fluid based service brake scheme supplemented by an add-on arrangement providing brake by wire mode braking operation.

BACKGROUND OF THE INVENTION

The typical hydraulic fluid-based service braking system generally includes a power boosted master cylinder that is manually actuated by means of a brake pedal for pressurizing dual braking circuits to drive hydraulic actuators at the wheel brakes. This type of braking system is often supplemented by a hydraulic modulator assembly that operates to provide anti-lock braking, traction control and vehicle stability augmentation features. With such a conventional braking system, the wheel brakes are primarily operated by the manually actuated master cylinder with supplemental actuation pressure gradients supplied by the hydraulic modulator assembly during anti-lock, traction control and stability enhancement mode operation.

Brake by wire (BBW) has been coined as a term describing the ability to actuate vehicle wheel brakes via an electric signal generated by an on-board processor/controller or received from a source external to the vehicle. Brake torque is applied to the wheels without application of the vehicle's brake pedal. Advancing the typical conventional system into a BBW mode operable system can generally be achieved by two alternative means. First, is the option of providing an additional add-on system to the conventional hydraulic fluid-based system. Second, a new generation braking system can be developed from the ground up with the intent of providing BBW control. With the first alternative, the hydraulic fluid-based braking system remains substantially intact and the hydraulic modulator assembly is generally reworked to provide an autonomously generated fluid pressure source for electronically controlled braking functions. The second alternative may take the form of a so-called "pure" BBW system wherein the hydraulic fluid-based service braking system is supplanted by an electrical base system for basic braking functions. Such a system will generally be provided with a manually actuated back-up system that may be hydraulically operated. A common characteristic of both alternatives is that the addition of advanced braking functions and BBW capability tends to be accompanied by a high magnitude of complexity and cost. Accordingly, a BBW capable system option is preferable wherein alterations to a typical production hydraulic fluid-based system are minimized and the overall cost of the package is competitive. Further, it would be preferable if such a BBW system were operable in an arrangement with or without anti-lock, traction control and stability enhancement capabilities.

SUMMARY OF THE INVENTION

An aspect of the present invention provides a BBW add-on system for autonomous vehicle braking that supplies BBW control with a minimum of alteration to a hydraulic fluid-based service brake system. In accordance with this aspect, a BBW brake controller sends a signal to feed current to an electro-hydraulic modulator that generates pressure in the brake lines to actuate the wheel brakes independent of brake pedal application. A pressure control block operates to turn off the pressure path to one of a pair of pistons found in each controlled wheel brake caliper. The electro-hydraulic BBW modulator generated pressure is delivered to the isolated piston. The pressure level at each of the pair of pistons is monitored and communicated back to the BBW controller. Dual piston calipers are used allowing individual piston control effected either external to the caliper, or internal to the caliper if a pressure control block is incorporated into the caliper design.

According to preferred aspects of the present invention, the BBW controller executes the brake system control algorithm, performs diagnostic tests, receives BBW command signals from the vehicle level control, receives pressure sensor information from the pressure control block and receives status information from the service brake system. In addition, the BBW controller initiates electro-hydraulic modulator actuation and triggers vehicle driver informational displays. The BBW system operates to generate brake torque leading to vehicle deceleration of up to approximately 0.4 g. By leaving the hydraulic fluid-based service brake system substantially intact for regular (non-BBW) operation, high deceleration capability above 0.4 g is always present. Dual level driver override capabilities are provided to preserve the ability to control vehicle deceleration to a selected level through manual input. Advantageously, minimal disturbance of the hydraulic fluid-based service brake system and driver override capabilities provide high initial confidence levels for operating a BBW capable system.

In accordance with a preferred embodiment of the present invention described in greater detail herein, a vehicle braking system includes a hydraulic fluid-based service brake system. The service brake system has a hydraulic dual circuit master cylinder with a power boosted manual input brake pedal arrangement for generating braking pressure. The service brake system may or may not include a known hydraulic modulator with provision for an arrangement of anti-lock, traction control and stability enhancement capabilities. In either case, at least the front wheels of the vehicle include dual piston calipers with separately pressurizable actuation cavities. Each caliper actuation cavity is interconnected with hydraulic fluid pressure sources through separate flow paths which may diverge either internal or external to the caliper body. A solenoid operated valve is interposed in a conduit between the divergent flow paths. The solenoid operated valve is generally in a normally open condition providing free fluid communication between the hydraulic master cylinder and both pistons of the wheel brake.

During braking operation in a BBW control mode, the solenoid valve is shifted to a closed position such that one of the pistons is isolated from the master cylinder and is supplied with fluid pressure from an electro-hydraulic modulator. While operating in a BBW mode, manual override capabilities are provided in two levels. In a first-level override condition, manual input is provided through the hydraulic master cylinder to the one caliper actuation cavity that is not isolated for BBW mode control. The BBW control device monitors override action through the sensed pressure signals and can be programmed to adjust BBW actuation accordingly. In a second-level manual override condition, flow from the master cylinder is initiated through the solenoid operated valve allowing fluid pressure to both actuation cavities of the caliper, increasing overall torque in braking the wheels to the level demanded by the driver.

3

DESCRIPTION OF THE PREFERRED EMBODIMENT

Figure 1:
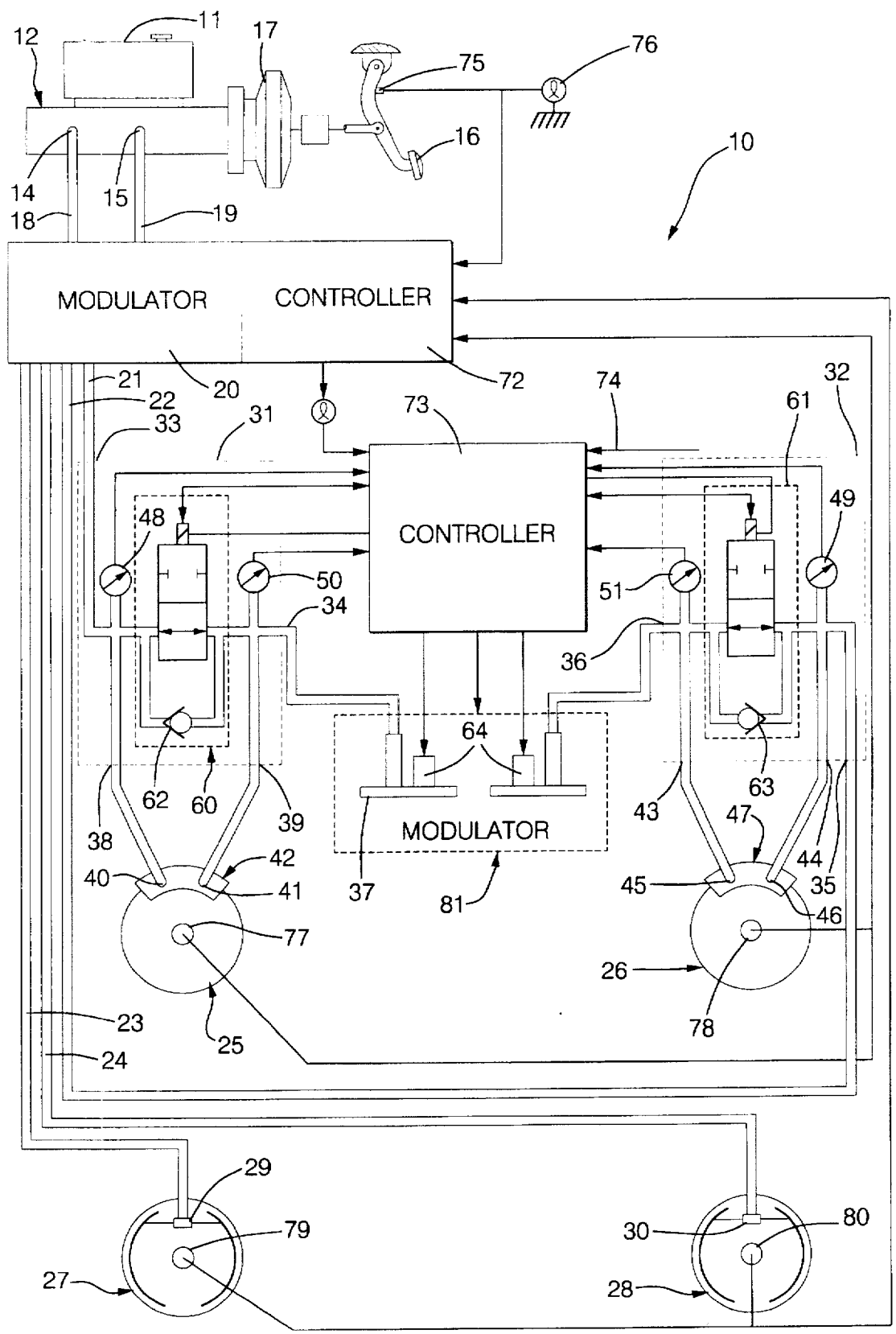
FIG. 1 is a diagrammatic illustration of a vehicle braking system according to the present invention.

Referring to the drawings, illustrated in FIG. 1 is a vehicle braking system designated in the aggregate as 10. The braking system 10 includes a hydraulic fluid based service brake system including master cylinder 12. The master cylinder 12 is of a conventional dual piston type and has dual internal pressure chambers, including one being in fluid communication with port 14, and another being in fluid communication with the port 15. Fluid reservoir 11 supplies fluid to the master cylinder 12 during manual braking operation and in addition, supplies fluid through the master cylinder 12 to the ports 14 and 15 during automated braking operation in a known manner. Manual brake pedal assembly 16 provides input to the master cylinder 12 with power assist from the booster 17 during manual brake apply. Brake lines 18 and 19 lead from the ports 14, 15 respectively, and connect into the hydraulic modulator assembly 20. The hydraulic modulator assembly 20 enables advanced braking functions such as anti-lock, traction control and stability augmentation in a manner well known in the art. Four output lines 21-24 lead to each of the individual wheel brakes 25-28. In the present embodiment the rear wheel brakes 27 and 28 each include an individual hydraulic actuator 29 and 30 respectively, for brake applications. Each of the front wheel brakes 25 and 26 are of the dual piston caliper type. The wheel brakes 25 and 26 are each associated with a pressure control block designated as 31 and 32 respectively. The pressure control block 31 includes a service brake port 33 and a BBW port 34. Similarly, the pressure control block 32 includes a service brake port 35 and a BBW port 36. The service brake ports 33 and 35 are connected back to the modulator 20 through brake lines 21 and 22 respectively. The BBW ports 34 and 36 are connected to a two-channel electro-hydraulic modulator 81.

The pressure control block 31 also includes a pair of ports 38 and 39 each connected to individual pistons 40 and 41 respectively, of the wheel brake 25. Optionally, the pressure control block 31 is provided as a separate unit or is incorporated into the caliper assembly 42 of the wheel brake 25. The pressure control block 32 also includes a pair of ports 43 and 44 that are connected to individual pistons 45 and 46 respectively, of the wheel brake 26. Optionally, the pressure control block 32 is provided as a separate unit or is incorporated into the caliper assembly 47. The service brake pressure available in pressure control block 31 through service brake port 33 is monitored by pressure sensor 48. Similarly, the service brake pressure available to pressure control block 32 through service brake port 35 is monitored by pressure sensor 49. The pressure available to pressure control block 31 at BBW port 34 is monitored by pressure sensor 50. Similarly, the pressure available to pressure control block 32 through BBW port 36 is monitored by pressure sensor 51.

Figure 2:
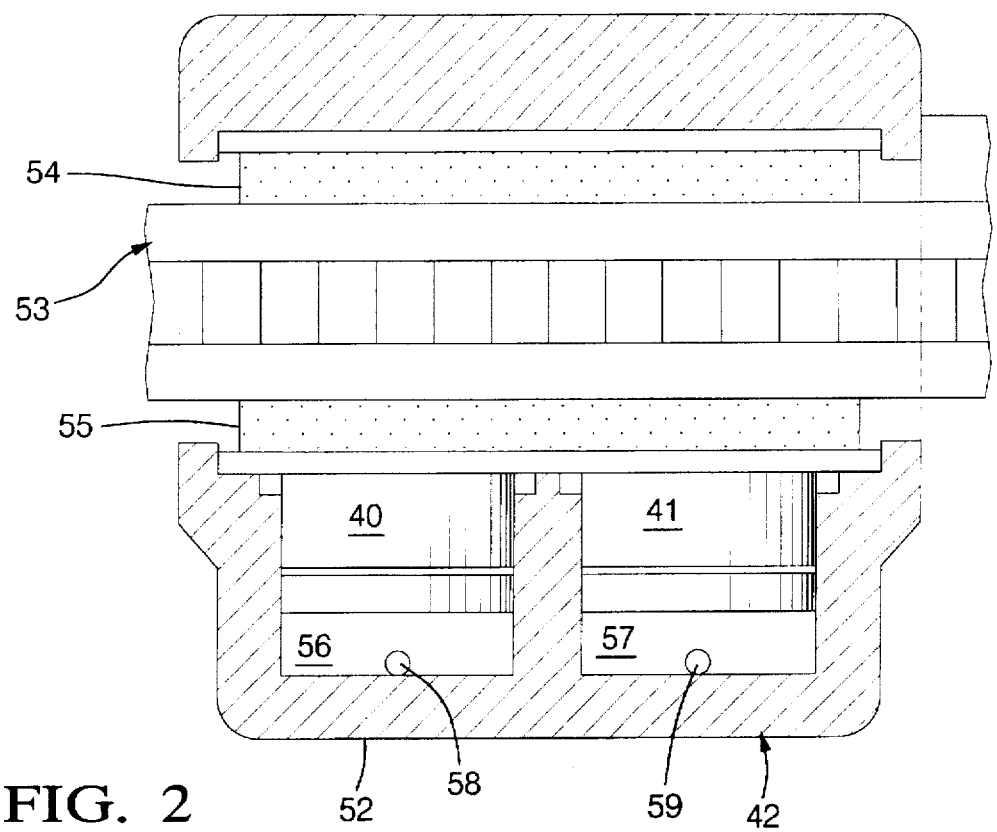
FIG. 2 is a schematic cross-sectional illustration of a dual piston caliper of FIG. 1.

For exemplary purposes, the brake caliper 42 is illustrated in FIG. 2 and for the following description, additional reference is directed thereto. The caliper assembly 42 includes a caliper body 52 formed in a conventional manner such as by casting and machining metal, and is configured to span across a rotatable brake rotor 53. A pair of brake pad assemblies 54 and 55 are captured between the caliper body 52 and the rotor 53. The caliper body 52 also includes a pair of actuation cavities 56 and 57 each containing a slidable piston 40 and 41, respectively. The actuation cavity 56 is in constant fluid communication with the port 38 of pressure control block 31 through the opening 58. Similarly, the actuation cavity 57 is in constant fluid communication with the port 39 of pressure control block 31 through the opening 59. Upon increasing fluid pressure communicated to the actuation cavities 56 and 57, the pistons 40 and 41, in combination with the caliper body 52, operate to force the pads 54 and 55 against the rotor 53 to provide brake application through frictional engagement generating braking torque. As noted above, the pressure control blocks 31 and 32 are optionally integrated into the bodies of caliper assemblies 42 and 47 respectively, with internal connections provided between the individual pistons of each caliper.

Referring again to FIG. 1, it can be seen that each of the pressure control blocks 31 and 32 includes a solenoid operated valve assembly, designated 60 and 61 respectively. The solenoid operated valve assembly 60 is positioned in an internal conduit that extends between the ports 38 and 39 of the pressure control block 31. Segments of the internal conduit, on opposite sides of the solenoid operated valve assembly 60, communicate with actuation cavities 56 and 57. Similarly, the solenoid operated valve assembly 61 is positioned in an internal conduit that extends between the ports 43 and 44 of the pressure control block 32. Segments of the internal conduit, on opposite sides of the solenoid operated valve assembly 61 communicate with the actuation cavities associated with pistons 45 and 46. Each of the solenoid operated valve assemblies 60 and 61, comprises a two-position valve that is normally placed in an open condition. For example, the solenoid operated valve assembly 60 normally permits fluid communication from the service brake port 33 to both ports 38 and 39 and therethrough, to both the pistons 40 and 41, respectively. Similarly, the solenoid valve assembly 61 normally provides fluid communication from the service brake port 35 to the ports 43 and 44 and therethrough, to both the pistons 45 and 46 respectively. Accordingly, upon the application of manual pressure to the brake pedal 16 pressure generated by the master cylinder 12 is freely communicated through the hydraulic modulator 20 to the pressure control blocks 31 and 32, and the rear wheel brakes 27 and 28. The pressure is also freely communicated through the pressure control blocks 31 and 32 to the front wheel brakes 25 and 26. Upon the release of the brake pedal 16, the applied fluid pressure is released back through the master cylinder 12 to the reservoir 11.

When the solenoid valve assembly 60 is energized, fluid communication from the BBW port 34 to the service brake port 33 is preempted. However, fluid communication in the opposite direction from the service brake port 33 to the port 39 is possible above a threshold level due to the check feature 62 of the solenoid valve assembly 60. The check feature 62 is provided as either an integral component of the valve itself in a well known manner such an unseatable poppet valve, or as a separate check valve feature. The solenoid valve assembly 61 includes a check feature 63 that operates in a manner similar to the check feature 62.

Figure 3:
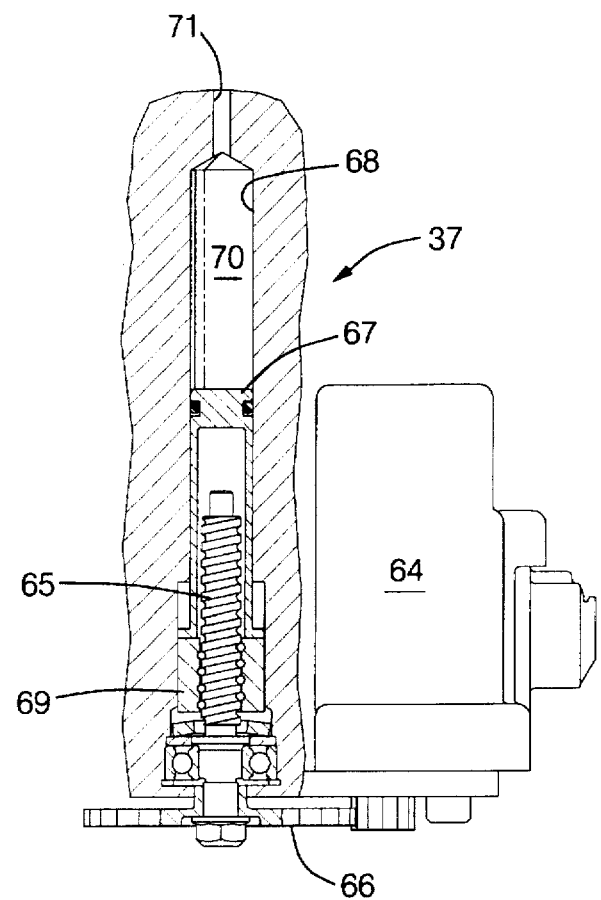
FIG. 3 is a schematic cross-sectional illustration of the BBW modulator of FIG. 1.

Referring to FIG. 3, an example is illustrated showing actuator 37 for one channel of the two-channel electro-hydraulic modulator 81, with both channels being substantially identical. Such an electro-hydraulic modulator actuator is a known device and is disclosed in U.S. Pat. No.

5,246,283 which issued Sep. 21, 1993, is commonly assigned, and is hereby specifically incorporated herein by reference. The actuator 37 includes a motor pack 64 that preferably utilizes an electro-mechanical brake in a conventional manner. The motor pack 64 drives a power screw assembly 65 through an interposed gear train 66. A piston assembly 67 is slidably carried in bore 68 and is connected to a non-rotative nut 69 which is engaged with power screw assembly 65. The cavity 70, formed within the bore 68, communicates with the BBW port 34 of the pressure control block 31 (shown in FIG. 1), through the conduit 71. A pressure variation will occur in the cavity 70 in response to a signal delivered to the motor pack 64 which is reversibly driven, so as to either contract the size of the cavity 70 or expand the size thereof, through sliding movement of the piston assembly 67.

As shown in FIG. 1, the electrical elements of the brake system 10 include an ABS/TCS brake controller 72 that is associated with the modulator 20. In addition, a BBW brake controller 73 is included that communicates with the controller 72, the motor pack 64, the pressure sensors 48, 49, 50, and 51, and receives various inputs 74. The inputs include operational information from the ABS/TCS brake controller 72, external highway platooning signals, radar braking signals, and the like. The BBW brake controller 73 may be any microprocessor-based controller suitable for providing output commands to the dual channel electro-hydraulic modulator 81 and the solenoid valve assemblies 60 and 61, and for receiving input signals from the various sources described above.

The ABS/TCS brake controller 72 receives input from the brake light switch 75 which is a conventional brake pedal switch of a known type commonly used to turn on rear brake lights 76. Additionally, the ABS/TCS brake controller 72 receives input from the wheel speed sensors 77-80, which are well known to those skilled in the art, and may be of the type commonly used in anti-lock brake systems. The modulator 20 is of a well known type and through assistance from the controller 72 is capable of independently providing a hydraulic pressure reduction or increase in the brake lines 21-24 for anti-lock braking traction control and vehicle handling augmentation purposes in a known manner.

The BBW brake controller 73 operates in response to selected vehicle based, or external signals, and issues a pressure command to the BBW sub-system device 81. At initiation of a BBW mode, the controller 73 enables energization of the solenoid valve assemblies 60 and 61. This turns off the pressure path in between the individual pistons of the wheel brakes 25 and 26. The modulator 81 is triggered into action driving the individual actuator pistons to develop a target pressure that is communicated to the BBW ports 34 and 36, and through the pressure control blocks 31 and 32 respectively, to the pistons 41 and 45. The pressure generated is set by monitoring the pressure sensors 50 and 51 to actuate the wheel brakes 25 and 26 to a desired level. Pressure from the modulator 81 is prevented from being delivered to the pistons 40 and 46 by the check features 62 and 63 of the valve assemblies 60 and 61, respectively. By operating one of the individual pistons of each wheel brake 25 and 26, the modulator 81 is capable of delivering a pressure to generate wheel torque at the wheel brakes 25 and 26 resulting in vehicle deceleration of approximately a maximum of 0.4 g.

Operation of the braking system 10 in a BBW mode includes receiving a signal through the inputs 74 calling for a brake by wire mode of operation. The BBW brake controller 73 is preprogrammed to respond to accepted signals with a desirable response. A shift signal is delivered from the BBW brake controller 73 to energize the solenoid operated valves 60 and 61. A pressure command signal is sent from the BBW brake controller 73 to the electro-hydraulic modulator 81 to initiate operation of the motorpack 64. The motorpack 64 is driven to establish the fluid pressure at a targeted value based on the pressure command signal. The BBW brake controller 73 determines whether the pressure generated by the electro-hydraulic modulator 81 is equal to the targeted value and adjusts the generated pressure as necessary by further driving of the motorpack 64.

During BBW mode operation, dual driver override capabilities are provided. When a manual input is received on the brake pedal 16 during a BBW mode, the master cylinder 12 generates pressure that is communicated through the modulator 20 to the individual wheel brakes 25-28. The BBW controller 73 is alerted to the entry into a manual mode by an increasing pressure sensed by the pressure sensors 48 and 49. The solenoid valve assemblies 60 and 61 remain energized and thus closed. However, the master cylinder generated pressure is communicated to the rear wheel brakes 27 and 28 and to the pistons 40 and 46 of the front wheel brakes 25 and 26 respectively. Accordingly, without communicating fluid through the solenoid valve assemblies 60 and 61, the manual brake actuation starts applying additional torque to the wheel brakes 25 and 26 and braking of the vehicle is increased with a first-level driver override condition. In a second-level driver override situation, wherein the pressure generated by the master cylinder 12 is demanding a braking torque for resulting in additional vehicle deceleration, the solenoid assemblies 60 and 61 are configured such that a pressure differential between the service brake and BBW side greater than a predetermined threshold amount, pushes open the check features 62 and 63 respectively, of the solenoid valve assemblies 60 and 61, allowing pressure from the master cylinder 12 to enter the BBW side and further actuate the pistons 41 and 45 increasing overall torque applied by the wheel brakes 25 and 26.

Through means of the present invention, a full brake by wire system is provided with minimal disturbance to a common production brake system which provides high initial confidence level for operation of such a system with advantageous driver override capabilities. The brake by wire system is autonomously operable with or without an interconnected ABS/TCS/stability enhancement modulator.

I claim:
1. A braking system comprising:
   a master cylinder;
   a wheel brake connected to the master cylinder by a brake line and including a caliper assembly with first and second pistons;
   an electro-hydraulic modulator including a motor and being connected to the wheel brake; and
   a pressure control block associated with the wheel brake including a first port communicating with the brake line so that fluid pressure generated by the master cylinder is communicable through the pressure block to the first and the second pistons of the caliper assembly for operation of the braking system in a manual apply mode and, the pressure control block including a second port communicating with the electro-hydraulic modulator so that fluid pressure generated by the electro-hydraulic modulator is communicable through the pressure control block to the second piston of the caliper assembly and is prevented from being communicated to the first piston of the caliper assembly by a solenoid valve assembly positioned in the pressure control block.

2. A braking system according to claim 1 further comprising an anti-lock braking modulator interposed in the brake line between the master cylinder and the wheel brake.

3. A braking system according to claim 2 further comprising a brake by wire controller wherein operating the braking system includes the steps of:

(a) receiving a signal calling for a brake by wire mode of operation;

(b) sending a shift signal from the brake by wire controller to energize the solenoid valve;

(c) sending a pressure command signal from the brake by wire controller to the electro-hydraulic modulator to initiate operation of the motor;

(d) driving the motor to generate a pressure to a targeted value based on the pressure command signal;

(e) determining whether the generated pressure is equal to the targeted value; and (f) when the generated pressure is not equal to the targeted value, driving the motor to adjust the generated pressure.

4. A braking system comprising:

a master cylinder;

a wheel brake connected to the master cylinder by a first line and including a caliper assembly with first and second pistons;

an anti-lock braking modulator interposed in the brake line;

an electro-hydraulic modulator including a motor and being connected to the wheel brake by a second brake line;

a pressure control block associated with the wheel brake including a first port communicating with the first brake line so that fluid pressure generated by the master cylinder is communicable through the anti-lock braking modulator and the pressure block to the first and the second pistons of the caliper assembly for operation of the braking system in a manual apply mode and, the pressure control block including a second port communicating with the electro-hydraulic modulator through the second brake line so that fluid pressure generated by the electro-hydraulic modulator is communicable, to operate the braking system in a brake by wire mode, through the pressure control block to the second piston of the caliper assembly and is prevented from being communicated to the first piston of the caliper assembly by a solenoid valve assembly positioned in the pressure control block and the solenoid valve assembly being operable to close a conduit in the pressure control block that normally permits fluid communication between the first and the second ports, and when the solenoid valve is closed the first piston of the caliper assembly remains in open fluid communication with the master cylinder through the first brake line providing a fluid route for a first level driver override to the first piston, wherein the solenoid valve includes a check valve feature that is openable at a selected threshold pressure generated in the first brake line providing a second level driver override to both the first and the second piston.

5. A braking system according to claim 4 wherein operating the braking system includes the steps of:

(a) receiving a signal calling for a brake by wire mode of operation;

(b) sending a shift signal from the brake by wire controller to energize the solenoid valve;

(c) sending a pressure command signal from the brake by wire controller to the electro-hydraulic modulator to initiate operation of the motor;

(d) driving the motor to generate a pressure to a targeted value based on the pressure command signal;

(e) determining whether the generated pressure is equal to the targeted value; and (f) when the generated pressure is not equal to the targeted value, driving the motor to adjust the generated pressure.

6. A braking system comprising:

a master cylinder generating a braking pressure in response to actuation of a brake pedal;

a wheel brake connected to the master cylinder by a first line and including a caliper assembly with first and second pistons;

an anti-lock braking modulator interposed in the brake line operable to modulate the braking pressure in a programmed manner;

an electro-hydraulic modulator including a motor and being connected to the wheel brake by a second brake line;

a pressure control block associated with the wheel brake including a first port communicating with the first brake line so that the braking pressure generated by the master cylinder is communicable through the anti-lock braking modulator and the pressure block to the first and the second pistons of the caliper assembly for operation of the braking system in a manual apply mode and, the pressure control block including a second port communicating with the electro-hydraulic modulator through the second brake line so that fluid pressure generated by the electro-hydraulic modulator is communicable, to operate the braking system in a brake by wire mode without application of the brake pedal, through the pressure control block to the second piston of the caliper assembly and is prevented from being communicated to the first piston of the caliper assembly by a solenoid valve assembly positioned in the pressure control block and the solenoid valve assembly being operable to close a conduit in the pressure control block that normally permits fluid communication between the first and the second ports, and when the solenoid valve is closed the first piston of the caliper assembly remains in open fluid communication with the master cylinder through the first brake line providing a fluid route for a first level driver override to provide the braking pressure to the first piston regardless of the magnitude of the fluid pressure generated by the electro-hydraulic modulator, wherein the solenoid valve includes a check valve feature that is openable at a selected threshold pressure generated in the first brake line providing a second level driver override to both the first and the second piston when the braking pressure is greater than the magnitude of the fluid pressure generated by the electro-hydraulic modulator;

wherein operation of the braking system includes the steps of:

(a) receiving a signal calling for a brake by wire mode of operation;

(b) sending a shift signal from the brake by wire controller to energize the solenoid valve;

(c) sending a pressure command signal from the brake by wire controller to the electro-hydraulic modulator to initiate operation of the motor;

(d) driving the motor to establish the fluid pressure generated by the electro-hydraulic modulator pressure to a targeted value based on the pressure command signal;

(e) determining whether the pressure generated by the electro-hydraulic modulator is equal to the targeted value;

(f) when the pressure generated by the electro-hydraulic modulator is not equal to the targeted value, driving the motor to adjust the generated pressure;

(g) effecting the first level driver override by applying force to the brake pedal;

(h) generating the braking pressure in the master cylinder;

(i) communicating the braking pressure through the first brake line to the first piston of the caliper;

(j) effecting the second level driver override by applying a sufficient force to the brake pedal to generate the braking pressure to a level greater than the magnitude of the pressure generated by the electro-hydraulic modulator by the selected threshold pressure; and (k) communicating the braking pressure generated in step j to the first and the second pistons of the caliper.

* * * * *